United States Patent Office 2,860,448
Patented Nov. 18, 1958

2,860,448

PROCESS FOR RECLAIMING AND IMPROVING SALINE AND ALKALINE SOILS

Fred M. Carasso, Yuma, Ariz.

No Drawing. Application April 11, 1955
Serial No. 500,703

5 Claims. (Cl. 47—58)

This invention pertains to an improved process and product for reclaiming and improving saline and/or alkaline soils.

One of the objects of this invention is to develop certain alkaline soils for satisfactory farming which are now unfit for productive agricultural use.

Another object of this invention is to reclaim for productive agricultural use certain soils which have become unfit for farming due to inadequate drainage, high water table, use of irrigation water containing excessive amounts of injurious salts and faulty irrigation practices and the like.

It is also a further object of this invention to reclaim for productive agricultural use certain portions of producing farms which are now unfit for proper use due to the presence of excessive amounts of injurious salts which usually take the form of alkali spots in the farmed area.

Still another object is to provide preventive maintenance for farm land now in production to control or prevent accumulation of excessive amounts of injurious salts in the soil.

It is an object to provide improved productivity for farm land by counteracting the adverse effects of injurious salts.

Still another object is to provide improved physical structure for the soils, for better aeration, and for more favorable environment for plant growth.

One of the basic objects of this invention is to improve the rate of water infiltration, penetration and drainage by (a) facilitating the removal, by leaching, of injurious salts, (b) preventing the accumulation of excessive quantities of injurious salts in the root zone, and (c) increasing the effectiveness of the applied water for plant growth.

And finally, it is an object of this invention to effect a chemical reaction with the injurious salts to form products which are beneficial to the soil thus (a) making it possible to reclaim or improve soils containing salts, and (b) treat irrigation water so as to prevent possible accumulation of injurious salts.

The need for this invention is best recognized by a study of data secured from official U. S. Government sources, namely: the U. S. Department of Agriculture, U. S. Salinity Laboratory, the Bureau of Reclamation, U. S. Department of Interior. According to the Bureau of Reclamation, there are at present 24,250,000 acres of land under irrigation in the Western States out of a potential 30,000,000 acres. Of these the Bureau of Reclamation supplies water to 7,150,000 acres at a cost of $1,200,000,000. These 7,150,000 acres produced crops valued at nearly one billion dollars in 1954. According to the same authority, the acreage affected by salinity and alkalinity in the Western States is estimated to be five million acres, in varying degrees, either completely out of production, or requiring special treatment.

According to the U. S. Department of Agriculture, losses in crop production caused by salinity were estimated at $75,000,000 or more, annually (as reported in Circular No. 707, dated September 1944). These losses have substantially increased since that time with the increase in irrigated acreage and other factors. The same circular states further: "Salinity causes not only a reduction of crop yields, but also, if severe, an outright abandonment of irrigated land. More than 1,000,000 acres were abandoned in the decade 1929–1939, and probably half this abandonment may be attributed in large part to salinity. On much of the 20,000,000 acres of farm land (1944) now irrigated west of the Mississippi, the crop yields are reduced 10 to 20% by salinity, or an excess of soluble salts in the soil, commonly called alkali."

The product and process provided by this invention offers several important advantages. It is a complete and integrated process, comprising the following principal functions:

(a) Improving the physical structure of the soil so as to provide better aeration and a more favorable environment for plant growth.

(b) Improving the rate of water infiltration, penetration and drainage.

(c) Reacting chemically with the injurious salts present in saline and alkali soils to form products which are beneficial.

Such a process is much more thorough, rapid and effective than the methods now in use. All of the above mentioned functions are important. They make it possible to effectively attack the problem from every angle. Functions (a) and (b) are very helpful, as they facilitate leaching, and make it possible to remove some of the injurious salts in this manner. They also reduce any tendency for injurious salts to accumulate in subseqeunt irrigations, and thus, are very important in preventive maintenance. These functions increase the effectiveness and durability of the treatment, making it more practicable and economically feasible.

The third function (c) is necessary as it is not always feasible to remove enough of the injurious salts by leaching to permit satisfactory plant growth. In fact, it is possible with functions (a) and (b) only, to improve the soil structure and drainage without removing enough of the injurious salts to permit satisfactory crop growth. In the function (c) the injurious salts are converted chemically to beneficial products. This is most essential and has a very pronounced influence on resultant crop growth.

Good crop growth is obtainable by proper application of function (c) alone. However, the use of this function alone does not result in the desired rate of improvement in soil structure and drainage. Furthermore, the less effective removal of injurious salts makes it necessary to use larger amounts of material, with inferior results. With inferior drainage, injurious salts accumulate much more rapidly. Thus, all three functions supplement one another to make a more complete, effective and practical process.

The objects and functions of this invention can be accomplished by treating the soil with a single product comprising the following active ingredients:

(a) One or more surface-active or wetting agents.
(b) One or more hydrophilic colloids.
(c) One or more substances capable of reacting with the injurious soil salts to form products which are beneficial to soil structure and plant growth.

There is considerable freedom of choice in selecting the principal active ingredients. Several ingredients in each class have been proven to be effective, but there is also a considerable degree of variation in the effectiveness of the different ingredients. And in each class, there is one ingredient which has been proven to be superior to the others in that particular class. Furthermore, there are most effective formulations comprising the best ingredients in optimum proportions to produce a definite and homogeneous product.

The use of a surface-active or wetting agent has a very marked effect on the physical properties of the soil. This effect is clearly evident as the soil is wet by irrigation or rain. Rate of water infiltration, penetration and drainage is improved. The soil dries more readily, becomes much more friable and of improved tilth. The effect of the surface-active agent is markedly enhanced by the use of a suitable and hydrophilic colloid. The use of a hydrophilic colloid in conjunction with the surface-active agent results in a significant improvement in the rate of water infiltration, penetration and drainage, as well as a further improvement in soil structure. Although improvement of the physical properties of the soil is obtainable by means of the surface-active agent alone, the further improvement obtainable by the combination of the hydrophilic colloid and the surface-active agent, makes the use of such a combination advantageous. There is a wide variety of surface-active agents available. They differ greatly in chemical and physical properties. All three electrical types are effective, that is, they may either be anionic, cationic, or nonionic. All "wetting" or surface-active agents are effective to some degree, although they vary greatly in effectiveness. The alkyl esters of sodium sulfosuccinic acid are especially effective, as a class. The following specific "wetting" or surface-active agents are especially effective:

Aerosol OT=bis (2-ethylhexyl) sodium sulfosuccinate. U. S. Patent #2,441,341.

Surface-Active Agent BPE=bis (2-p-tertiary butyl phenoxyethyl) sodium sulfosuccinate.

Aerosol MA=sodium dihexyl sulfosuccinate.

Many other anionic "wetting agents" are also quite effective, but the above have been most satisfactory. An example of an effective cationic material is: "Cationic SP"=stearamide-propyl dimethyl-p-hydroxyethyl ammonium dihydrogen phosphate.

Various non-ionic materials have been shown to be quite effective. Typical examples are:

(1) Polyhydric alcohol fatty-acid esters;
(2) Polyoxy alkylene fatty-acid esters and related polymeric products;
(3) Dihydroxy lauramide 60.

Other nonionic materials might also be utilized.

Among the "hydrophilic colloids" there is a wide variety of natural and synthetic products which might be utilized. They differ greatly in effectiveness and cost. The natural hydrophilic gums represent one type of material which has given very good results. Guar gum has been particularly outstanding. Although guar gum has been most satisfactory of the hydrophilic colloids derived from natural sources, many others are effective. For example: Irish moss extractives, gum arabic, gum karaya, gum tragacanth, locust bean gum. Mixtures of blends of such gums might also be used. Also casein and its derivatives or gelatin are effective. Many synthetic hydrophilic colloids or water-soluble resins are effective; for example, materials like sodium carboxy methyl cellulose, hydroxyethyl cellulose, methyl cellulose, polyvinyl alcohol. Many other hydrophilic synthetic resins could be utilized but to date none has been found equal to guar gum in economy and effectiveness.

As previously stated, the surface-active or "wetting" agent and the hydrophilic colloid supplement one another in improving the physical structure of the soil, facilitating aeration, water infiltration, drainage and leaching. However, these functions alone are not sufficient for a complete effective process. This is especially true where, as frequently is the case, conditions are not favorable for rapid and satisfactory drainage. It is essential, therefore, in a complete and integrated process, to include the use of one or more materials capable of reacting with the injurious saline or alkaline substances to form products which are more favorable to soil structure and plant growth. Prior art does not provide a means of fulfilling this important function to the degree to which it is possible to do so by means of the product and process of this invention. Established methods aim merely to neutralize and control the excess alkalinity, without due consideration of the desirability of simultaneously converting the injurious saline or alkaline constituents to beneficial products.

Common methods of neutralizing excess alkalinity involve the use of materials like sulfur, gypsum, liquid lime sulfur, aluminum sulfate, iron sulfate, and sulfur dioxide. These materials are first converted to sulfuric acid and then form, by reaction with the alkaline sodium salts, sodium sulfate, which itself is injurious, and depend on removing the sodium sulfate by leaching. Such methods are slow and costly, unless conditions are favorable for rapid and satisfactory leaching. Materials like gypsum and liquid lime-sulfur also serve to improve soil structure by a process known as base-exchange, which involves the replacing of exchangeable sodium ion with calcium ion. The ratio of calcium ion to sodium ion is increased. Where the soil already contains appreciable quantities of calcium in the form of lime, calcium for "base-exchange" is made available by means of the acid-forming "soil-amendments" mentioned. These methods do not convert the injurious salts into beneficial products, but merely neutralize them to form, in most cases, sodium sulfate, which itself is injurious, although less so than the original alkaline salts. If it is desirable to use such "soil-amendments," their rapidity of action and effectiveness can be greatly increased by also including in the process the use of an effective, surface-active or "wetting" agent and a hydrophilic colloid, as disclosed in this invention.

The use of liberal quantities of organic matter, which, as a result of its decomposition, improves soil structure, has also the effect of releasing carbon dioxide, which is effective in neutralizing excess alkalinity and in making available exchangeable calcium ion from lime present in the soil. This desirable effect is enhanced by the use of acid-forming "soil amendments." Although the proper use of organic matter is generally beneficial and is an important factor in good farming as well as in reclamation and improvement of saline or alkali soils, its action on injurious or alkaline salts is comparatively slow. The significant factor in this phase of the current invention is the realization of the importance of the nature of the anionic or acidic constituent of the "soil amendment," selecting one whose sodium salt is not only not harmful, but actually has a favorable effect on soil structure and plant growth. Thus, the nature of the products formed as a result of the neutralization of the alkaline substances is of prime importance. Mere neutralization without due consideration of the nature of the anionic or acid constituent is not enough for best results.

This also applies to ion interchange reactions, or metathesis, involving saline compounds. When such a substance is used, reclamation or improvement of saline or alkali soils is much more rapid and complete than is possible with conventional "soil amendments." While this is true in any case, the advantage of the new "soil amendment," as disclosed in this invention, is obtained to the fullest extent, by using it in conjunction with the surface-active agent and hydrophilic colloid, as disclosed in this invention. "Soil amendments" suitable for this phase of the invention may vary widely in chemical composition, the essential requirement being that the anionic or acid constituent be one whose sodium salt is non-injurious or has comparatively favorable effect. It is preferable that the "soil amendment" be either a calcium salt or the free acid. The use of a calcium salt is of further benefit, since the calcium ion is available for "base exchange," in which exchangeable sodium ion is replaced with calcium ion. Such "base exchange" may also occur when the free acid is used, as the acid can react with lime present in the soil to form available calcium ions.

While other metallic salts of appropriate acidic constituents would fall within the scope of this invention, best results are obtained by the use of a calcium salt or the free acid. One or more such "soil amendments" may be used. An acid plus a calcium salt may be used. In this case, the acid need not be the one corresponding to the calcium salt. Various mixtures may be used if desired. The acid constituent may be either organic or inorganic. Calcium nitrate is an excellent example of a calcium salt of an inorganic acid which is very effective. Although calcium nitrate is very well known as a fertilizer, its usefulness in improving or reclaiming saline or alkaline soils has not previously been recognized. Yet it is more rapid in action and more effective than gypsum.

There are other "soil amendments" which are even superior to calcium nitrate. A wide variety of organic acids may be utilized in this connection. Various acids, well-known as sequestering or chelating agents, such as ethylene diamine tetra acetic acid, other polyamino polycarboxylic acids, citric acid, and their calcium salts, are very effective. Various complex organic acids, derived from by-products of the lumber or wood pulp industries, and/or their salts are very useful for this purpose. The chemical structure of most of these substances is not exactly known. They are available commercially in various degrees of purity. Their composition is influenced both by the nature of the raw material and the extraction process. Such materials are very desirable; being both very effective as well as reasonable in price. These materials are available under a variety of trade names and may or may not be mixtures. They are generally available to meet given specifications, and the nature of their essential active constituents is specified. Thus, different lots of a given product are uniform and give reproducible results. Certain of these substances may be available in a high degree of purity. Others are deliberate mixtures. A high degree of purity is not essential for satisfactory performance in this phase of the invention.

The following illustrate substances of this type (indicating the principal active ingredients): Lignin, its calcium salt, or other derivatives, calcium lignosulfonate, a mixture of complex phenolic acids extracted from redwood bark known as "palconic acid," the sulfonation product of "palconic acid" known as Palotanic acid, calcium lignosulfonate, available in various degrees of purity, and under various trade names, is very effective. These are mere illustrative examples—the invention is not to be construed as being limited to these particular examples. Although the proportions of the principal active ingredients comprising the product of this invention may be varied over a considerable range, there are definite formulations giving optimum results. The finished product may be prepared in various forms and applied in various ways. These are well known to those skilled in the art.

Although the principal purpose of this invention is the reclamation or improvement of saline or alkaline soils, its use or application is not limited to such soils. It has been shown to be very beneficial to soils which are successfully producing crops and do not contain excessive quantities of injurious salts. The product and process of this invention have been shown to be beneficial to soil structure, rate of water infiltration, water penetration, and drainage, and also improving aeration and tilth of soil which does not contain excessive quantities of injurious substances. It is, therefore, not to be construed that the practice of this invention is limited to saline or alkaline soils, but is applicable to any soil. This invention is also applicable for preventing accumulation of injurious substances in soils. It may be applied to irrigation water, or any other material which might be used on soils. Therefore, its use is not limited to direct application to the soils, but it may be applied in conjunction with other materials, or in any vehicle or carrier.

It is important to note that this product and process is particularly effective in solving the problem of soil crusting. Its effectiveness in this regard is enhanced when applied in conjunction with fertilizers, pesticides, herbicides, and other materials used in agriculture. This can be done either by prior mixing and application as one composite product, or by application as distinct materials either simultaneously or separately. This product may also be applied in conjunction with seed at the time of planting.

The material may be applied in a highly concentrated form, as prepared, undiluted. It may be used as a dry powder, as a paste or as a liquid. It may be diluted to an appropriate degree with one or more suitable diluents, "extenders," or "carriers," which may be liquids, solids or pastes. Application may be made by any appropriate method. The product may be uniformly applied over the entire area—it may be applied irregularly to fit local conditions, or it may be applied in "bands," "rows" or "spots" of appropriate dimensions, to fit given conditions. Application may be made on the surface or at any suitable depth. It may be mixed into the soil by suitable tillage, if desired, but such mixing or tillage is not required.

Any treatment of the soil either prior to, during, or subsequent to application of the material is at the option of the user of the material according to his conditions. Application may be made in any appropriate manner. The material may be applied as a solid in various ways, e. g.: broadcast, drilled, by injection, in bands, as a side dressing, or dusted on either from the ground or by air. Methods of application are at the discretion of the user. Similarly, it may be applied in liquid or paste form, by spraying, sprinkling, injecting, either from the ground or by air. Application may be made in irrigation water.

In addition to the principal active ingredients previously described (and independent of any diluents "carriers," or other materials mentioned above) other ingredients may be desirable. For example, most substances used as hydrophilic colloids are subject to deterioration due to bacteria, molds, etc. particularly in the presence of moisture. Therefore, it is desirable to include in the formulation a suitable preservative, to inhibit such action by micro-organisms, the selection and use of such preservatives is well known to those skilled in the art. It may also be desirable to use a suitable material to facilitate incorporation of the hydrophilic colloid, prevent lumping, etc. during manufacture. Such materials and methods of use are well known to those skilled in the art. It may also be desirable to use a suitable material to facilitate dissolving or diluting of the product. Such materials and methods of use are also well known.

While this invention is not to be construed as being limited in any way in connection with the selection and use of such minor ingredients, it is desirable to select for this purpose (if used) such ingredients which, in addition to serving their specific function, are non-injurious to soil structure or plant growth. The product of this invention may be prepared by customary methods, known to those skilled in the art. In most cases, simple mixing or combining of the respective ingredients in proper sequence is all that is necessary. Application of heat is not necessary, however heat may be used if desired. The relative proportions of the respective ingredients may be varied over a considerable range without seriously impairing effectiveness. However, for best and most economical results, it is desirable to select optimum proportions, which are influenced to a certain extent by the special ingredients used.

While representative formulations are illustrated in the following examples, it is understood that the scope of this invention is not limited to these specific examples:

*Example 1*

| | Percent by weight |
|---|---|
| "Aerosol OT" | 4.5 |
| Guar gum | 4.5 |
| Calcium nitrate | 91.9 |

This may be prepared and applied as a solid, or in aqueous solution. A suitable preservative is desirable.

Example 2

| | Parts |
|---|---|
| Bis (2-ethylhexyl) sodium sulfosuccinate | 6.5 |
| Guar gum | 6.5 |
| Calcium lignosulfonate | 87.0 |
| Suitable preservative | 0.5 |

This preparation may be easily made as a dry solid. It is advantageous to use a suitable amount of an appropriate solvent (preferably methyl, ethyl, or iso-propyl alcohol) to facilitate uniform incorporation. The volatile solvent evaporates off readily.

Example 3

| | Parts |
|---|---|
| "Aerosol OT" 75% aqueous | 13.3 |
| Guar gum | 10.0 |
| Calcium lignosulfonate | 90.0 |
| Benzoic acid (preservative) | 1.5 |
| Methyl alcohol | 20.0 |
| Water (if desired) | Q. S. |

This product, as well as the others, may be prepared either as a dry solid or as an aqueous solution of desired concentration. The alcohol may or may not be removed.

Example 4

| | Parts |
|---|---|
| Sodium di hexyl sulfosuccinate | 23 |
| Guar gum | 11 |
| Calcium lignosulfonate | 67 |
| Methyl p-hydroxy benzoate (preservative) | 1.5 |

Example 5

| | Parts |
|---|---|
| "Surface-active" agent BPE | 1 |
| Guar gum | 1 |
| Lignin | 5 |
| Calcium nitrate | 18 |
| Sawdust | 75 |

A preparation of this type is most advantageously applied as a dry material by conventional methods.

Example 6

| | Parts |
|---|---|
| "Aerosol OT" | 11.5 |
| Guar gum | 11.5 |
| Calcium lignosulfonate | 77.0 |
| Cottonseed meal | Q. S. |

Sawdust and cottonseed meal are examples of possible solid "diluents or extenders." They can be either simply mixed or they may be impregnated with the principal active ingredients. This may be done by established procedures.

Example 7

| | Parts |
|---|---|
| "Aerosol OT" | 10.0 |
| Guar gum | 10.0 |
| Calcium lignosulfonate | 80.0 |
| Suitable preservative | Q. S. |

Such a product may be prepared, handled and utilized as a dry concentrated product, or it may be: (a) diluted with an appropriate quantity of water, or (b) diluted with an appropriate quantity of a suitable dry carrier or diluent, such as sawdust or cottonseed meal.

Example 8

| | Parts |
|---|---|
| "Aerosol OT" | 10.0 |
| Guar gum | 10.0 |
| Ethylene diamine tetra acetic acid | 32.0 |
| Suitable preservative | Q. S. |

Example 9

| | Parts |
|---|---|
| "Aerosol OT" | 10.0 |
| Guar gum | 10.0 |
| Calcium lignosulfonate | 80.0 |
| Calcium nitrate | Q. S. |
| Preservative | Q. S. |

This illustrates the use of calcium nitrate as a beneficial extender or diluent. Inasmuch as the product of this invention may be applied simultaneously with commercial fertilizers, it is within the scope of this invention that other commercial fertilizers may be utilized as diluents, carriers or extenders.

Example 10

| | Parts by weight |
|---|---|
| "Aerosol OT" | 3 |
| Locust bean gum | 3 |
| Chelating agent | 6 |
| Calcium nitrate | 88 |

This may be prepared and applied as a solid, or in water solution. A suitable preservative may be added.

Example 11

| | Parts by weight |
|---|---|
| "Cationic SP" | 5 |
| Hydroxyethyl cellulose | 5 |
| Ethylene diamine tetra acetic acid | 90 |

Example 12

| | Parts by weight |
|---|---|
| Bis (2-ethylhexyl) sodium sulfosuccinate | 10 |
| Guar gum | 10 |
| Citric acid | 20 |
| Calcium lignosulfonate | 240 |

This product may be prepared either as a dry, free-flowing solid; or in liquid form as a water solution of any desired concentration. A suitable preservative may be added.

Example 13

| | Parts by weight |
|---|---|
| Sodium di-hexyl sulfosuccinate | 5 |
| Gum karaya | 5 |
| Calcium lignosulfonate | 150 |

The formulation illustrated by this example may be prepared and utilized either in liquid form or solid form. For utilization in solid form, it is desirable to add suitable "carrier" or "extenders." Examples of such additives, which may be added in any desired amount, include: sawdust, cottonseed meal, and various others.

Example 14

| | Parts by weight |
|---|---|
| Bis (2-ethylhexyl) sodium sulfosuccinate | 6 |
| Guar gum | 4 |
| Citric acid | 6 |
| Calcium lignosulfonate | 72 |

What is claimed is:

1. In a method of reclaiming and improving saline and alkaline soils, the step of adding to the soil a product including the combination of: bis (2-ethylhexyl) sodium sulfosuccinate, guar gum, a preservative, calcium ligno-sulfonate, and at least one organic acid; said product being effective as a unit in saline and alkaline soils to improve soil structure and promote plant growth.

2. In a method of reclaiming and improving saline and alkaline soils, the step of adding to the soil a product comprising the following principal active ingredients, effective proportions of which fall within the ranges of: two to ten parts, by weight, of surface-active agent; two to ten parts, by weight, of hydrophilic colloid, and forty to ninety-six parts, by weight, of calcium salt.

3. In a method of reclaiming and improving saline and alkaline soils, the step of adding to the soil a product including the following principal active ingredients, effective proportions of which fall within the ranges of: two to ten parts, by weight, of surface-active agent, two to ten parts, by weight, of hydrophilic colloid, zero to twenty parts, by weight, of organic acid, and forty to ninety-six parts, by weight, of calcium salt.

4. In a method of reclaiming and improving saline and alkaline soils, the step of adding to the soil a product comprising the following principal active ingredients, effective proportions of which are: six parts, by weight, bis (2-ethylhexyl) sodium sulfosuccinate; four parts, by weight, guar gum; six parts, by weight, citric acid, and seventy-two parts, by weight, calcium lignosulfonate.

5. In a method of treating soil, the step of adding to the soil a product including the combination of: at least one surface-active agent, at least one hydrophilic colloid, and calcium lignosulfonate.

References Cited in the file of this patent
UNITED STATES PATENTS

| | | |
|---|---|---|
| 847,749 | Ellis | Mar. 19, 1907 |
| 2,218,695 | Leatherman | Oct. 22, 1940 |
| 2,284,002 | Lontz | May 26, 1942 |
| 2,314,091 | Jones | Mar. 16, 1943 |
| 2,441,341 | Vitalis | May 11, 1948 |
| 2,574,027 | Farber | Nov. 6, 1951 |
| 2,625,471 | Mowry et al. | Jan. 13, 1953 |
| 2,689,173 | Clarke | Sept. 14, 1954 |
| 2,720,726 | Ferguson | Oct. 18, 1955 |
| 2,770,540 | Vierling | Nov. 13, 1956 |

OTHER REFERENCES

Aldrich et al.: "Effects of Several Nitrogenous . . .," published April 1945 in Soil Science (magazine), vol. 59, No. 4, pages 299 through 312.

Dutt: "Certain Aspects . . .," published May 1948, in Soil Science (magazine), vol. 65, No. 5, pages 383 through 392.

Annett et al.: "Utilization of Sulfite Pulp Mill Wastes . . .," published December 1952, in Paper Industry, vol. 34, No. 9, pages 1109 through 1111.

Modern Plastics, vol. 30, No. 5, January 1953, pages 200 and 202, article "The Plastiscope—Soil Conditioners."

Amberg: "Spent Sulphite Liquor Pollution Abatement . . .," published February 27, 1953, in Paper Trade Journal, vol. 136, No. 9, pages 20, 21, 31.

Walton: "Chelation," published June 1953, in Scientific American, vol. 188, No. 6, pages 68, 69, 70, 72, 74, 76.

Naval Stores Review, vol. 63, No. 19, August 22, 1953, pages 16, 17, 25, 26, 27, article, "Tall Oil in Asphalt Products."

Whistler: "Guar Gum . . .," on pages 45 through 61 of Advances in Chemistry Series, No. 11, Natural Plant Hydrocolloids, published September 1954, by American Chemical Society (Washington, D. C.). Only page 48 is relied upon.